Oct. 19, 1937.  E. H. LAND  2,096,696
VIEWING DEVICE CONTROLLING REFLECTED GLARE
Filed Aug. 27, 1935
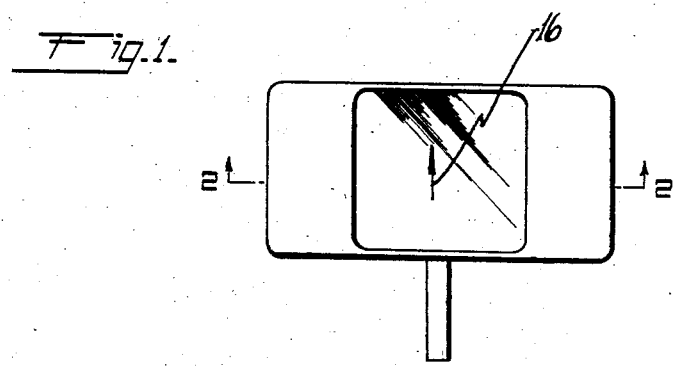
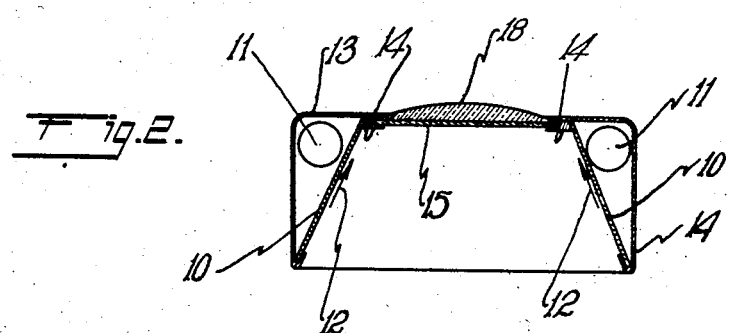
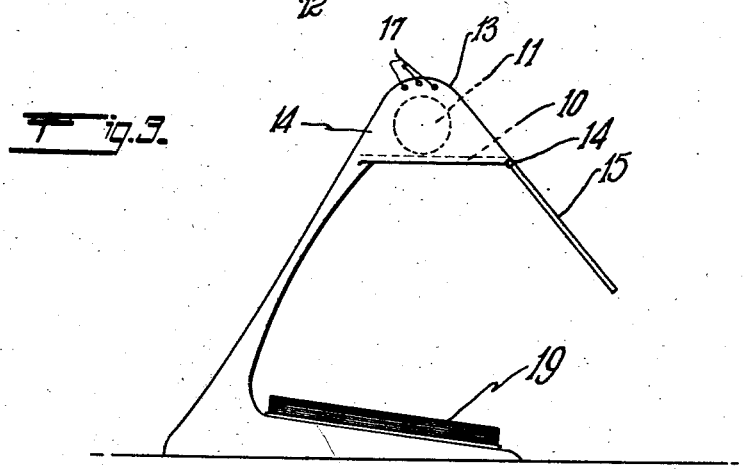
INVENTOR
Edwin H. Land
BY Donald L. Brown
ATTORNEY Patented Oct. 19, 1937.

2,096,696

UNITED STATES PATENT OFFICE 2,096,696

VIEWING DEVICE CONTROLLING REFLECTED GLARE

Edwin H. Land, Wellesley Farms, Mass., assignor to Sheet Polarizer Company, Inc., Union City, N. J., a corporation of New Jersey Application August 27, 1935, Serial No. 38,089

3 Claims. (Cl. 88—39)

This invention relates to new and improved devices and more particularly to viewing devices employing polarized light.

An object of the invention is to provide a viewing device of the character described wherein means are employed for blocking light which may not have suffered depolarization, reflected to the eyes of an observer from the object viewed.

A further object of the invention is to provide means for supporting and positioning light polarizing elements adapted to polarize beams emanating from a light source and to block light reflected without depolarization from an object illuminated by said beams.

Other objects of the invention are to provide viewing devices of the character described adapted to be employed in connection with the examination or study of objects of varying sizes, to provide viewing devices of the character described equipped with suitable light sources and suitable polarizing screens and to provide such devices in an economical, sturdy and efficient form.

Other objects of the invention will in part be obvious and will in part appear hereinafter.

The invention accordingly comprises the features of construction, combination of elements and arrangement of parts which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Figure 1 is a plan view of a device embodying one form of the invention,

Fig. 2 is a view in section of the device shown in Fig. 1 along the lines 2—2, and Fig. 3 is a view in elevation of another device embodying another form of the invention, with hidden parts shown in dotted lines.

It has been well known that glare reflected from the surface of objects being viewed results in substantial eye strain. Under certain circumstances, for example where the object has a shiny surface or where the object must be viewed under a somewhat intense light, this glare assumes such proportions as to render any extended observation of the object almost impossible. It is furthermore often quite impossible for the observer to eliminate the glare by merely adjusting the position of the object viewed with respect to the light source. This is in part due to the fact that it is impossible ordinarily to position the object with respect to the light source so that reflected glare will be eliminated from more than one eye of the observer. The angles at which the eyes of the observer look at the object differ and if the object is shifted so that glare is reduced or eliminated for one eye it is ordinarily still present for the other. Furthermore certain objects must be viewed from certain positions and it is frequently impossible for this reason to adjust the object in any way to reduce the glare.

This invention contemplates the provision of means for completely eliminating all glare from the object viewed. In certain modifications of the invention furthermore an entire illuminating and glare eliminating combination is provided. Generally speaking the invention contemplates means to polarize the beam or beams illuminating the object to be viewed and a polarizing vizor or viewing screen interposed between the object and the eyes of an observer and positioned to block light reflected from the object but not depolarized thereby. The invention contemplates furthermore the provision of suitable frame and positioning elements and of suitable light sources associated therewith and with the polarizing screens so that a unitary illuminating and glare eliminating structure is provided.

Where plane polarizing elements are employed to polarize the illuminating beam and to form the viewing screen, the polarizing axes of the elements functioning to polarize the beam should be positioned at right angles to the polarizing axis of the viewing screen. Where circular polarizers are employed it is to be understood that the viewing screen should comprise the same type of circular polarizer as that employed with the light source.

It is to be understood that more than one viewing screen may be employed, as for example on different sides of the light source, if desired, care being taken to secure a proper positioning of the polarizing axis of each such screen.

Suitable polarizing elements for use in structures embodying the invention may comprise thin sheet-like elements of neutral color, or tinted to give daylight color from an incandescent source, such as are now available.

In the drawing 10 represents polarizing elements interposed in the path of beams emanating from a light source 11 adapted to illuminate an object to be viewed. The arrows 12 indicate the position of the polarizing axes of the elements 10 which are preferably so positioned that the ratio of the non-depolarized glare to the depolarized reflection is reduced thereby even before the reflected beams reach the viewing screen. Associated with the light source there may be any suitable reflecting surface 13 positioned and adapted to direct the beam to the object being viewed. This reflector may, if desired, be vented as for example as shown in Fig. 3 at 17. Frame elements 14 are provided to hold the polarizing elements 10 in predetermined position with respect to the light source 11.

A second light polarizing element positioned to function as a viewing vizor 15 is provided to intersect rays reflected from the object to the eyes of an observer. The arrow 16 indicates the position of the plane of polarization of the element 15. It will be noted that the polarizing axis of this element is at right angles to the polarizing axes of the elements 10.

Suitable frame elements 14 are provided to hold the element 15 in operative relation to the light source and polarizing element 10, whereby substantially complete elimination of reflected glare is assured.

The device shown in Figure 1 is typical of a great number of devices embodying the invention which may be employed to view objects where the device as a whole is placed down over the object and where the object is viewed through a viewing screen which, in devices of this character, may ordinarily be positioned between a plurality of cooperating light sources. It is to be understood that devices of this type may lend themselves to the examination of a wide variety of objects of varying size, such for example as postage stamps, wet anatomical specimens, or large machine drawings.

The device shown in Fig. 3 is representative of the embodiment of the invention in the form of an ordinary table reading lamp where the object viewed 19 is not surrounded by the device but merely positioned beneath the light source in such a way that light reflected therefrom traverses the viewing screen 15.

It is to be understood that associated elements may be employed with any form of the invention to effect still further alterations in the characteristics of the transmitted beam. For example, a magnifying lens 18 is shown in Fig. 2, as associated with the viewing screen 15. Such a lens may be particularly effective in connection with the examination of such small objects as miniatures, postage stamps, and the like.

In operation the device functions to effect a color saturation of the object viewed as well as to eliminate reflected glare. All reflected light is ordinarily composed of some specularly reflected light which has not acquired the color characteristics of the remainder of the reflected beam. This device functions to block such specularly reflected light. As a result the color characteristics of the remainder of the beam are apparently accentuated and an apparent increased color saturation of the object viewed is obtained.

Under certain circumstances it may be desirable to effect an apparent increase in the intensity of the reflected glare, for example, where the glare characteristics of the reflected light are being examined. Under such circumstances the desired result may be obtained with devices embodying this invention, if the viewing screen is positioned with its polarizing axis parallel to the polarizing axis of the polarizing screen associated with the light source. This result may be accomplished by mounting the polarizing screens 15 or the polarizing screens 10 for relative rotation with each other. Such a structure is to be deemed included within the scope of this invention.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention what I claim as new and desire to secure by Letters Patent is:

1. A reading lamp comprising, in combination, a substantially upright supporting element, a reflector supported thereby, a light source positioned adjacent said reflector and adapted therewith to project a diverging beam of light, a thin, sheet-like polarizing element positioned to intercept light emanating from said source, said polarizing element cooperating with said reflector to form an enclosure for said light source, a second thin, sheet-like polarizing element positioned to block light traversing said first-mentioned polarizing element and supported in part at least by said upright element, said light source and said polarizing elements being so positioned with respect to each other that light emanating from said source and falling upon an object positioned adjacent the base of said upright element will be reflected from said object through said second-mentioned polarizing element to the eyes of an observer positioned in normal viewing position.

2. In a device of the character described, in combination, a supporting frame, a light source, a housing therefor, said light source being so held by said frame as to direct a diverging beam of light upon an object positioned adjacent the base of said frame, a thin, sheet-like, light-polarizing element held by said housing to intercept said divergent beam, a second sheet-like polarizing element fixedly positioned adjacent said first-mentioned polarizing element and supported by said frame and adapted to block polarized light transmitted by said first-mentioned polarizing element, said second mentioned polarizing element being of such size and being so positioned as to intercept substantially all light reflected from the surface of an object illuminated by said light source to the eyes of an observer in normal viewing position.

3. A viewing device of the character described comprising a supporting frame, a reflector supported thereby, a light source positioned within said reflector and adapted to project a divergent beam toward the base of said supporting frame, sheet-like polarizing means held by said frame in position to intercept said divergent beam, a second sheet-like polarizing means positioned adjacent said light source and adapted to block polarized light transmitted by said first-mentioned polarizing means, a magnifying lens positioned adjacent said second-mentioned polarizing means and adapted to intercept light emanating from said source and traversing both of said polarizing means, said lens and said second-mentioned polarizing means being supported and positioned by said frame and being of such size as to intercept substantially all light reflected from the surface of an object illuminated by said source to the eyes of an observer in viewing position.

EDWIN H. LAND.